United States Patent
Lin

(10) Patent No.: US 9,665,322 B2
(45) Date of Patent: May 30, 2017

(54) IMAGE FORMING APPARATUS FOR EXECUTING PRINT JOB AND METHOD FOR CONTROLLING THE SAME

(71) Applicant: CANON KABUSHIKI KAISHA, Tokyo (JP)

(72) Inventor: Zhi Lin, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/791,029

(22) Filed: Jul. 2, 2015

(65) Prior Publication Data

US 2016/0004492 A1    Jan. 7, 2016

(30) Foreign Application Priority Data

Jul. 7, 2014 (JP) ................................ 2014-139838
Feb. 9, 2015 (JP) ................................ 2015-023356

(51) Int. Cl.
G06F 3/12 (2006.01)

(52) U.S. Cl.
CPC .......... *G06F 3/1238* (2013.01); *G06F 3/1204* (2013.01); *G06F 3/1222* (2013.01); *G06F 3/1239* (2013.01); *G06F 3/1285* (2013.01)

(58) Field of Classification Search
USPC ....................................................... 358/1.13
See application file for complete search history.

(56) References Cited

U.S. PATENT DOCUMENTS

2007/0176946 A1* 8/2007 Matoba ................ G03G 15/502
                                                    345/619
2014/0002847 A1* 1/2014 Mizuno .............. G06K 15/4095
                                                     358/1.14

FOREIGN PATENT DOCUMENTS

JP         2012-254618 A    12/2012

* cited by examiner

*Primary Examiner* — Ngon Nguyen
(74) *Attorney, Agent, or Firm* — Canon U.S.A., Inc. IP Division

(57) ABSTRACT

An image forming apparatus includes an obtaining unit configured to obtain attribute information of a print job that has been input to the image forming apparatus, a registration unit configured to register user identification information in which user information indicating a user who has input the print job and group information indicating a group where the user belongs are associated with each other, the user information and the group information being included in the obtained attribute information, a generation unit configured to generate on an operation screen an operation object for receiving an operation request for executing a print job, based on the registered user identification information, and a display control unit configured to display, in response to receiving selection of the generated operation object, a list screen with a list of print jobs input by a user identified from the user identification information corresponding to the selected operation object.

17 Claims, 26 Drawing Sheets

| | | |
|---|---|---|
| 1901 | • JOB NAME | NEW PRODUCT.doc |
| 1902 | • DEPARTMENT IDENTIFICATION INFORMATION | 1111 |
| 1903 | • JOB OWNER NAME | Yamada |
| 1904 | • DATE | 03/20/2014-18:05 |
| 1905 | • PRINT SETTINGS | ONE-SIDED COLOR 1in1 |
| | ... | ... |

FIG. 7

| USER NAME | PASSWORD | DEPARTMENT IDENTIFICATION INFORMATION | ROLE |
|---|---|---|---|
| Yamada | | 1111 | |
| Suzuki | | 1111 | |

| | |
|---|---|
| • JOB NAME | 1901 |
| • DEPARTMENT IDENTIFICATION INFORMATION | 1902 |
| • JOB OWNER NAME | 1903 |
| • DATE | 1904 |
| • PRINT SETTINGS | 1905 |
| • PC NAME | 1906 |
| • PAGE COUNT | 1907 |
| • APPLICATION ID | 1908 |
| • INPUT SOURCE IP ADDRESS | 1909 |
| ... | |

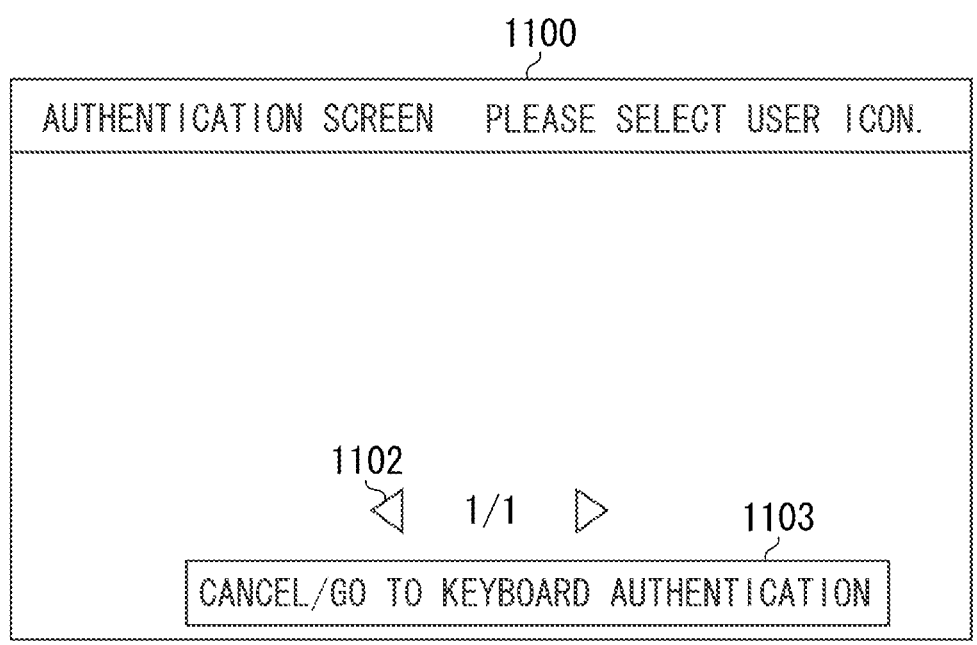

FIG. 16
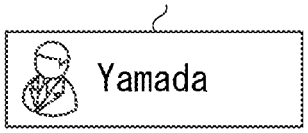 2110
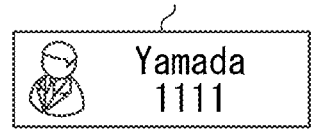 2120
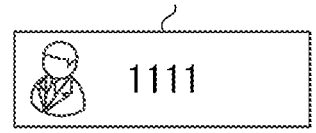 2130

| USER NAME | PASSWORD | DEPARTMENT IDENTIFICATION INFORMATION | ROLE |
|---|---|---|---|
| Yamada | ***** | 3333 | Administrator |

1520

IMAGE FORMING APPARATUS FOR EXECUTING PRINT JOB AND METHOD FOR CONTROLLING THE SAME

BACKGROUND OF THE INVENTION

Field of the Invention

The present invention relates to an image forming apparatus for executing a print job.

Description of the Related Art

Recently, some image forming apparatuses have allowed a print job that has been input from a personal computer (PC) to be reserved in a temporary storage area of an auxiliary storage device thereof. Thus, the user who has input the print job can log in to the image forming apparatus at desired timing to print the job. This is called authentication printing. However, an administrator needs to register identification information of the user in advance in a user identification information storage location (user database) so that the user can log in to the image forming apparatus.

Japanese Patent Application Laid-Open No. 2012-254618 discusses a technique for automatically registering the user name of a user who has input a job in a user database when the user has input the job. This technique saves an administrator from having to register user identification information in advance in the user database. The Japanese Patent Application Laid-Open No. 2012-254618 also discusses a technique (simple authentication) in which the registered user name is displayed on an authentication screen and the user can readily log in to a device by selecting the user name of the user.

Moreover, some recent image forming apparatuses employ an authentication method called "departmental authentication" by which login control is performed based on department identification information. By using "departmental authentication", a limitation on the number of sheets to be used, and/or count of the number of used sheets can be set on a department-by-department basis. Moreover, some image forming apparatuses employ an authentication method that is a combination of "user authentication" and "departmental authentication".

In a conventional technique, even when a job with a specified user name and specified department identification (ID) is input to an image forming apparatus in an environment where "departmental authentication" and "user authentication" are enabled, the department ID cannot be automatically registered in a department database. Further, the user name and the department ID cannot be automatically associated with each other. Consequently, to limit the number of sheets to be used or to count the number of used sheets on a department-by-department basis, a user needs to register the department ID afterward or manually associate the department ID with the user name, which is troublesome for the user. Hence, in a case where an authentication mode such as the above-described "departmental authentication" in which authentication is performed according to where the user belongs and an authentication mode such as the above-described "user authentication" in which authentication is performed according to user information are both enabled, the user needs to perform the cumbersome task of associating these authentication modes with each other.

SUMMARY OF THE INVENTION

The present invention is directed to a technique capable of readily associating an authentication mode for performing authentication according to where the user belongs with an authentication mode for performing individual authentication in a print environment.

According to an aspect of the present invention, an image forming apparatus for executing a print job includes an obtaining unit configured to obtain attribute information of a print job that has been input to the image forming apparatus, a registration unit configured to register user identification information in which user information indicating a user who has input the print job and group information indicating a group where the user belongs are associated with each other, the user information and the group information being included in the attribute information obtained by the obtaining unit, a generation unit configured to generate on an operation screen an operation object for receiving an operation request for executing a print job, based on the user identification information registered by the registration unit, and a display control unit configured to display, in response to receiving selection of the operation object generated by the generation unit, a list screen with a list of print jobs input by a user identified from the user identification information corresponding to the selected operation object.

According to an exemplary embodiment of the present invention, a technique capable of readily associating an authentication mode for performing authentication according to where the user belongs with an authentication mode for performing individual authentication in a print environment can be provided.

Further features of the present invention will become apparent from the following description of exemplary embodiments with reference to the attached drawings.

BRIEF DESCRIPTION OF THE DRAWINGS

FIG. 7 illustrates an example of a user identification information storage table.

FIG. 12 illustrates an example of attribute information of a print job.

FIG. 13 illustrates an example of an authentication screen.

FIG. 16 illustrates examples of an icon displayed on the authentication screen.

DESCRIPTION OF THE EMBODIMENTS

Hereinafter, exemplary embodiments of the present invention will be described with reference to the drawings.

Figure 1:
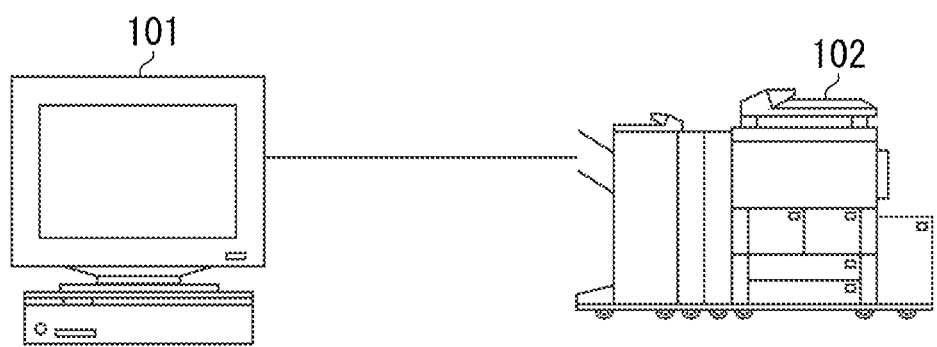
FIG. 1 illustrates an example of a system configuration of a reservation printing system.

FIG. 1 is a diagram illustrating an example of a system configuration of a reservation printing system according to a first exemplary embodiment of the present invention. The reservation printing system illustrated in FIG. 1 includes an information processing apparatus 101 and an image forming apparatus 102. The information processing apparatus 101 and the image forming apparatus 102 are capable of communicating with each other via a network. The information processing apparatus 101 generates a print job and transmits the generated print job to the image forming apparatus 102. The image forming apparatus 102 executes the print job received from the information processing apparatus 101 to perform printing. In the present exemplary embodiment, the information processing apparatus 101 and the image forming apparatus 102 are assumed to be connected to each other via a network. However, the information processing apparatus 101 and the image forming apparatus 102 may be configured to be connected to each other via a parallel cable, a serial cable, and a universal serial bus (USB) cable.

Figure 2:
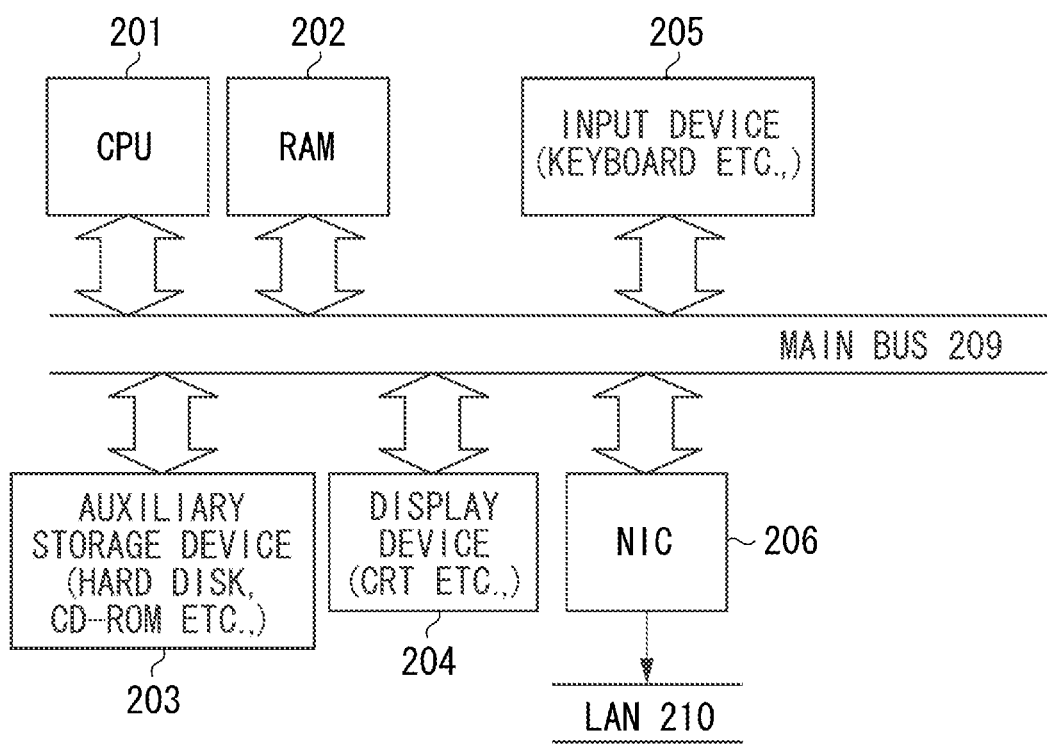
FIG. 2 is a diagram illustrating an example of a hardware configuration of an information processing apparatus.

FIG. 2 is a diagram illustrating an example of a hardware configuration of the information processing apparatus 101. A central processing unit (CPU) 201 controls the information processing apparatus 101. A random access memory (RAM) 202 functions as a work area for the CPU 201. An auxiliary storage device 203 (e.g., a hard disk, a floppy disk (registered trademark), and a compact disk read only memory (CD-ROM)) stores various programs to be executed by the CPU 201 and various data to be used for processing executed by the CPU 201. The CPU 201 loads the programs stored in the auxiliary storage device 203 into the RAM 202 and executes the programs to realize a functional configuration of the information processing apparatus 101 to be described below.

A display device 204 (e.g., a cathode-ray tube (CRT) display and a liquid crystal display) displays various information (e.g., a message) to notify a user of the information. An input device 205 (e.g., a mouse and a keyboard) receives an input to the information processing apparatus 101 from a user. A network interface card (NIC) 206 is used so that the information processing apparatus 101 and other network devices mutually exchange data via a local area network (LAN) 210. The above-described devices are mutually connected via a main bus 209.

Figure 3:
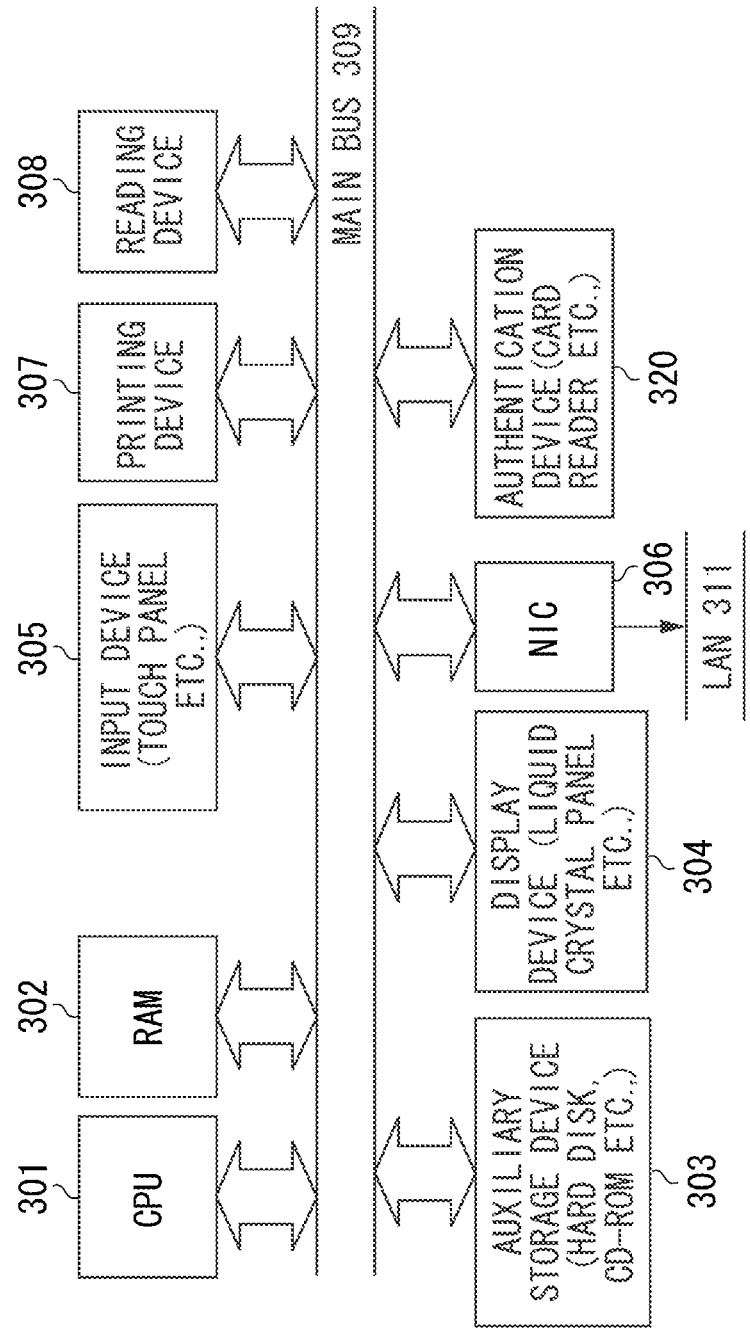
FIG. 3 is a diagram illustrating an example of a hardware configuration of an image forming apparatus.

FIG. 3 is a diagram illustrating an example of a hardware configuration of the image forming apparatus 102. A CPU 301 controls the image forming apparatus 102. A RAM 302 functions as a work area for the CPU 301. An auxiliary storage device 303 (e.g., a hard disk and a CD-ROM) stores various programs to be executed by the CPU 301 and various data to be used for processing executed by the CPU 301. Further, the auxiliary storage device 303 can temporarily store data and can also be used instead of the RAM 302. The CPU 301 loads the programs stored in the auxiliary storage device 303 into the RAM 302 and executes the programs to realize a functional configuration of the image forming apparatus 102 and processing in flowcharts to be described below.

A display device 304 (e.g., a liquid crystal panel) displays, for example, a state of the image forming apparatus 102 and an error message. An input device 305 (e.g., a touch panel and a keyboard) receives an input for specifying a desired print job from a user. A NIC 306 is used so that the image forming apparatus 102 and other network devices mutually exchange data via a local area network (LAN) 311.

A printing device (printing engine) 307 prints scanned image data on a sheet. The printing device 307 is capable of identifying a state of a sheet feed option (e.g., a feed cassette) and a state of a sheet discharge option (e.g., a finishing device) for print processing. A reading device (scanner) 308 reads a paper document placed on a platen glass to generate monochrome binary image data (print data) or color multivalued image data (print data). The printing device 307 can print the image data read by the reading device 308. The printing device 307 can also reserve the image data in the auxiliary storage device 303 and print the reserved image data at desired timing. This is called reservation printing. An authentication device 320 can read a card held over by a user to perform login authentication (card authentication). The authentication device 320 can also perform login authentication (keyboard input authentication) based on input information that is input via the input device 305. The above-described devices are mutually connected via a main bus 309.

Figure 4:
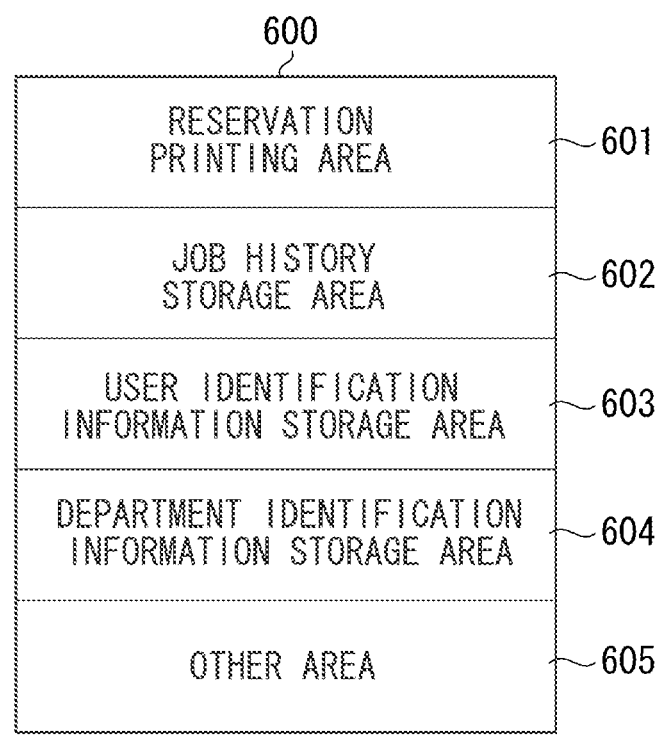
FIG. 4 is a conceptual diagram illustrating an example of area classification of an auxiliary storage device.

FIG. 4 is a conceptual diagram illustrating an example of area classification 600 in the auxiliary storage device 303. In the present exemplary embodiment, the areas of the auxiliary storage device 303 are classified into a reservation printing area 601, a job history storage area 602, a user identification information storage area 603, a department identification information storage area 604, and other area 605.

The reservation printing area 601 stores print jobs. The job history storage area 602 stores history information of the print jobs. The user identification information storage area 603 stores user identification information (including user name information and password information) which will be described below. The image forming apparatus 102 uses the user identification information when performing login authentication of a user. The login authentication includes simple authentication in addition to the card authentication and the keyboard input authentication that are described above with reference to FIG. 3. In the simple authentication, the login authentication can be performed simply by a user pressing (selecting) a user icon on an operation screen. The image forming apparatus 102 according to the present exemplary embodiment can use such simple authentication. The department identification information storage area 604 stores department identification information (e.g., department ID), which will be described below, indicating a department to which a user belongs. In the present exemplary embodiment, a case where a user belongs to a "department" is taken as an example. However, the user may belong to a group or a team. The department identification information is an example of belonging information indicating an organizational unit where the user belongs. The other area 605 is an area other than the above-described areas. The other area 605 temporarily stores a copy job and a scanner job from the reading device 308. The other area 605 also stores information about the number of printed sheets according to charging.

Figure 5:
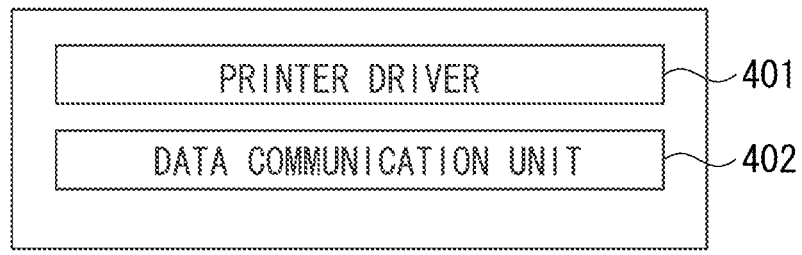
FIG. 5 is a diagram illustrating an example of a functional configuration of the information processing apparatus.

FIG. 5 is a diagram illustrating an example of the functional configuration of the information processing apparatus 101. As described above, the CPU 201 executes the programs stored in the auxiliary storage device 203 to realize the functional configuration of the information processing apparatus 101.

A printer driver 401 generates a print job according to an instruction from an arbitrary application such as text editor. A data communication unit 402 inputs the print job generated by the printer driver 401 to the image forming apparatus 102, and receives a processing result of the input print job from the image forming apparatus 102. The data communication unit 402 uses the NIC 206 when communicating with the image forming apparatus 102. Alternatively, the data communication unit 402 may use an interface such as a USB when communicating with the image forming apparatus 102.

Figure 6:
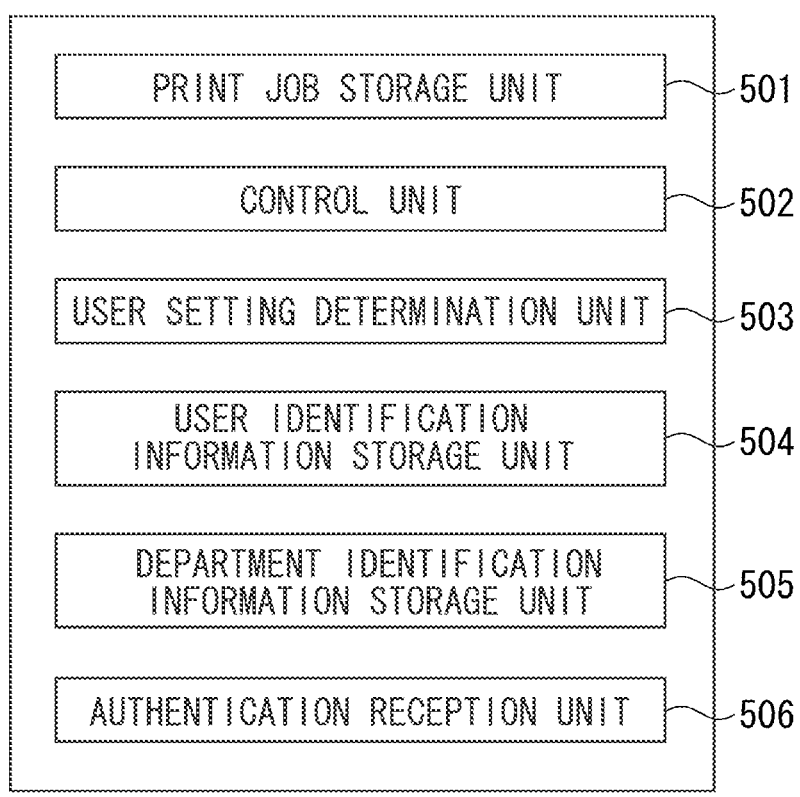
FIG. 6 is a diagram illustrating an example of functional configuration of the image forming apparatus.

FIG. 6 is a diagram illustrating an example of the functional configuration of the image forming apparatus 102. As described above, the CPU 301 executes the programs stored in the auxiliary storage device 303 to realize the functional configuration of the image forming apparatus 102.

A print job storage unit 501 stores the print job that is input from the information processing apparatus 101 in the reservation printing area 601. The print job storage unit 501 also stores a copy job and a scanner job from the reading device 308 in the other area 605. A control unit 502 receives the print job that is input from the information processing apparatus 101. The control unit 502 also reads attribute information (described below with reference to FIG. 12 and so on) of the print job to store the read attribute information in the user identification information storage area 603 and the department identification information storage area 604. Moreover, the control unit 502 displays an authentication screen (described below with reference to FIG. 15 and so on) on the display device 304 of the image forming apparatus 102, and further displays on the authentication screen the user identification information stored in the user identification information storage area 603, in the form of an icon, for example. The processing performed by the control unit 502 will be described in detail below with reference to FIGS. 19A and 19B and so on.

A user setting determination unit 503 refers to setting information of the image forming apparatus 102 to determine the print environment of the image forming apparatus 102. More specifically, the user setting determination unit 503 refers to setting information about forcible reservation setting (described below with reference to FIG. 9 and so on) and setting information about departmental authentication setting (described below with reference to FIG. 10 and so on) to determine the print environment.

A user identification information storage unit 504 stores user identification information in the user identification information storage area 603. When storing the user identification information in the user identification information storage area 603, the user identification information storage unit 504 registers the information in a user identification information storage table 1000 as illustrated in FIG. 7. In the example illustrated in FIG. 7, "Yamada" and "1111" are registered as a user name 1001 and department identification information 1003, respectively in the user identification information storage table 1000. The user name 1001 is an example of user information for identifying a user.

The user identification information registered in the user identification information storage table 1000 can be used for the card authentication, keyboard input authentication, and simple authentication that are described above. For example, if a user using the image forming apparatus 102 performs the keyboard authentication, an authentication reception unit 506 compares input information received from the user with the user identification information registered in the user identification information storage table 1000. If the two pieces of information match, the authentication reception unit 506 displays a main screen or an initial setting screen of the image forming apparatus 102 on the display device 304.

Figure 8:
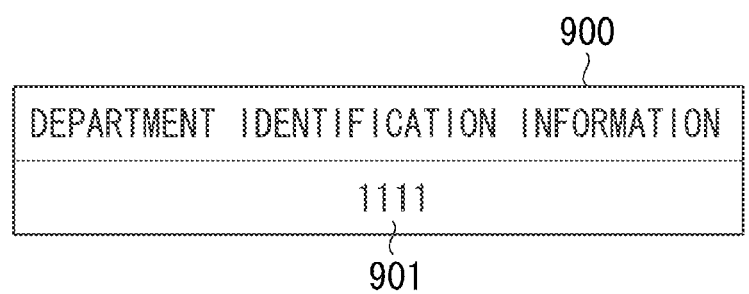
FIG. 8 illustrates an example of a department identification information storage table.

A department identification information storage unit 505 stores department identification information in the department identification information storage area 604 by registering the information in a department identification information storage table 900 as illustrated in FIG. 8. In the example illustrated in FIG. 8, "1111" is registered as department identification information 901 in the department identification information storage table 900. If a user selects an icon corresponding to the user identification information on an authentication screen (described below with reference to FIG. 15 and so on), the authentication reception unit 506 authenticates the user for login to the image forming apparatus 102. The processing performed by the authentication reception unit 506 will be described in detail below with reference to FIGS. 19A and 19B and so on.

Figure 9:
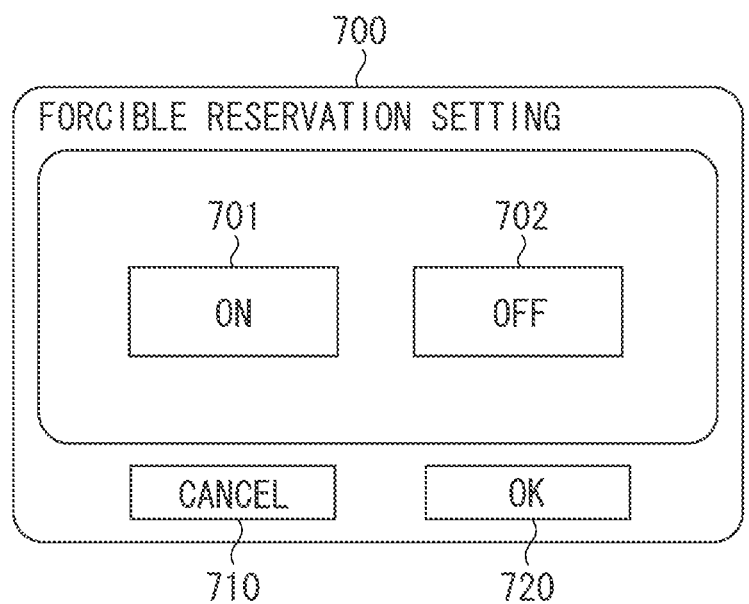
FIG. 9 illustrates an example of a screen for setting a forcible reservation mode.

FIG. 9 illustrates an example of a setting screen 700 for specifying an operation mode about whether to apply a forcible reservation mode to the image forming apparatus 102. When an administrator selects an ON button 701 and then presses an OK button 720, the forcible reservation mode is turned ON (enabled). When the administrator selects an OFF button 702 and then presses the OK button 720, the forcible reservation mode is turned OFF (disabled).

The operation mode used when the forcible reservation mode is ON causes a print job that is input to the image forming apparatus 102 to be forcibly reserved in the reservation printing area 601. On the other hand, the operation mode used when the forcible reservation mode is OFF causes a print job that is input to the image forming apparatus 102 to be printed immediately (subjected to through printing) without temporarily storing the print job in the reservation printing area 601. When the administrator presses a cancel button 710, the setting screen 700 for setting whether to turn ON or OFF the forcible reservation mode is closed.

The user setting determination unit 503 can refer to the setting information about the forcible reservation mode, which has been set on the setting screen 700, at desired timing. In the present exemplary embodiment, it is assumed that the forcible reservation mode is ON. That is, a print job that is input to the image forming apparatus 102 is always forced to be stored in the reservation printing area 601.

Figure 10:
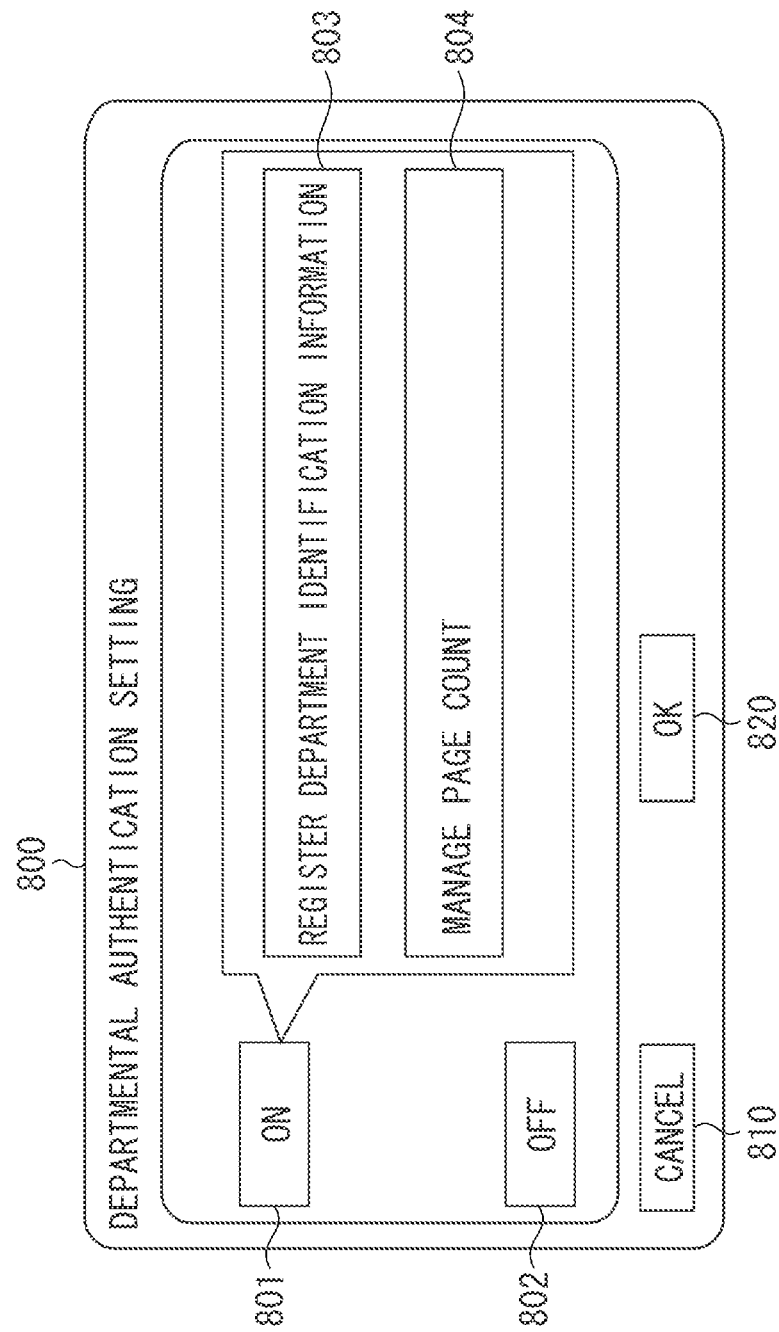
FIG. 10 illustrates an example of a screen for setting a departmental authentication mode.

FIG. 10 illustrates an example of a setting screen 800 for setting a departmental authentication mode of the image forming apparatus 102. The departmental authentication is an example of belonging authentication in which a user is authenticated according to an organizational unit where the user belongs. When the administrator selects an ON button 801 and then presses an OK button 820, the departmental authentication is turned ON (enabled). When the administrator selects an OFF button 802 and then presses the OK button 820, the departmental authentication is turned OFF (disabled).

The authentication mode used when the departmental authentication is ON causes the authentication reception unit 506 to perform authentication processing by using the department identification information registered in the department identification information storage area 604. More specifically, when a user using the image forming apparatus 102 performs the keyboard authentication, for example, the authentication reception unit 506 performs the authentication processing by comparing department identification information that is input by the user with the department identification information registered in the department identification information storage area 604. At this time, if a password is registered in advance in association with the department identification information registered in the department identification information storage area 604, the authentication reception unit 506 can perform more secure authentication processing according to the department identification information and the password that are input by the user. Moreover, if a user using the image forming apparatus 102 performs simple authentication, the authentication reception unit 506 performs authentication processing in response to receiving selection of a user icon corresponding to the department identification information, such as the user icon shown on an authentication screen (described below with reference to FIG. 20 and so on).

Further, when the departmental authentication is ON, the image forming apparatus 102 can set a limitation on the number of sheets to be used, and/or count of the number of used sheets on a department-by-department basis. The administrator uses a button 803 to register department identification information. When the administrator presses the button 803, department identification information can be registered in the department identification information storage table 900 stored in the department identification information storage area 604. The administrator uses a button 804 to set a limitation on the number of sheets to be used, on a department-by-department basis. When the administrator presses the button 804, a limitation on the number of sheets to be used for printing can be set for each department corresponding to the department identification information. Moreover, when the administrator presses a cancel button 810, the setting screen 800 for setting the departmental authentication mode is closed.

The user setting determination unit 503 can refer to setting information about the departmental authentication mode, which has been set on the setting screen 800, at desired timing. Moreover, the image forming apparatus 102 can store information about the number of sheets that have been actually used during execution of printing (information about the number of printed sheets) in the other area 605 of the auxiliary storage device 303.

Figure 11:
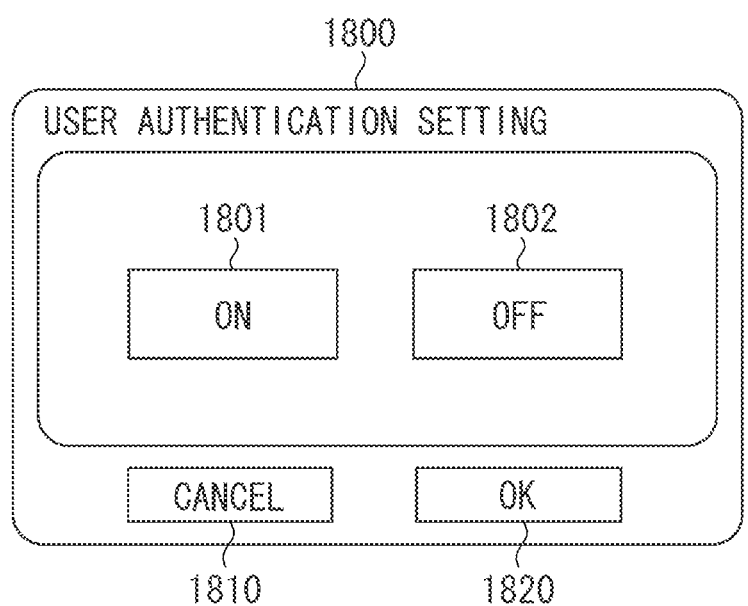
FIG. 11 illustrates an example of a screen for setting a user authentication mode.

FIG. 11 illustrates an example of a setting screen 1800 for setting a user authentication mode (individual authentication mode) of the image forming apparatus 102. When the administrator selects an ON button 1801 and then presses an OK button 1820, the user authentication is turned ON (enabled). When the administrator selects an OFF button 1802 and then presses the OK button 1820, the user authentication is turned OFF (disabled). Further, when the administrator presses a cancel button 1810, the setting screen 1800 for setting the user authentication mode is closed.

Figure 21:
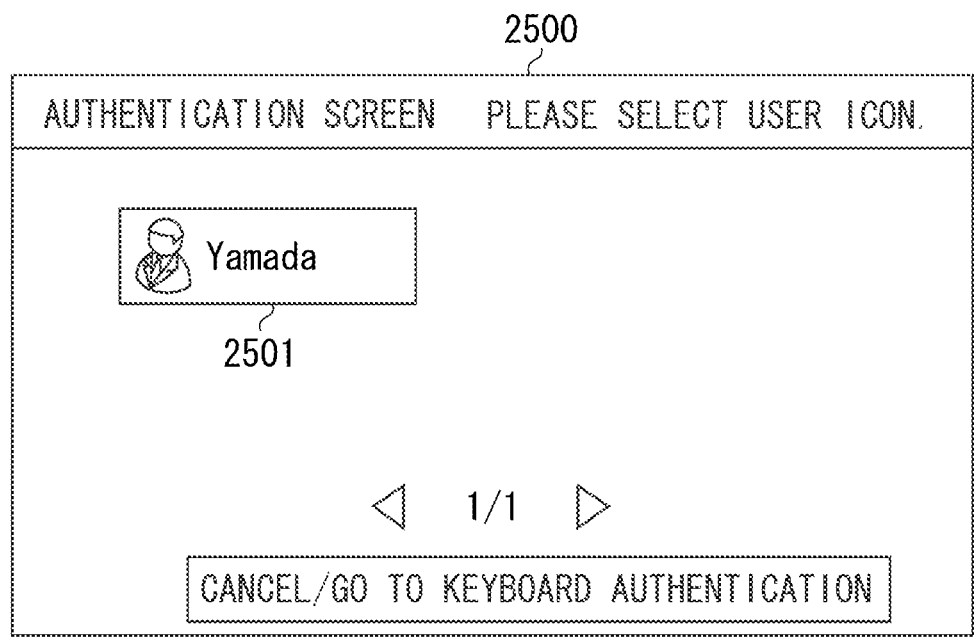
FIG. 21 illustrates yet another example of an authentication screen.

The authentication mode used when the user authentication is ON causes the authentication reception unit 506 to perform authentication processing by using user name information (or user ID) included in the user identification information registered in the user identification information storage area 603. More specifically, when a user using the image forming apparatus 102 performs the keyboard authentication, for example, the authentication reception unit 506 performs authentication processing by comparing user name information that is input by the user with the user name information included in the user identification information registered in the user identification information storage area 603. At this time, if a password is registered in advance in association with the user name information included in the user identification information, the authentication reception unit 506 can perform more secure authentication processing according to the user name and the password that are input by the user. Moreover, if a user using the image forming apparatus 102 performs simple authentication, the authentication reception unit 506 performs authentication processing in response to receiving selection of a user icon corresponding to the user name information, such as the user icon shown on an authentication screen (described below with reference to FIG. 21 and so on).

The user setting determination unit 503 can refer to the setting information about the user authentication mode, which has been set on the setting screen 1800, at desired timing.

Alternatively, an authentication mode in which the departmental authentication mode described above with reference to FIG. 10 and the user authentication mode described above with reference to FIG. 11 are associated with each other may be applied. That is, both the departmental authentication mode and the user authentication mode can be enabled.

The image forming apparatus 102 according to the present exemplary embodiment stores, in the user identification information storage area 603, user identification information in which the user name information and the department identification information that are included in the attribute information of an input print job are associated with each other. Then, based on the user identification information, the image forming apparatus 102 generates a user icon for receiving an operation request (authentication request) for executing the print job from the user, and displays the generated user icon on an authentication screen (operation screen). As a result, authentication processing using simple authentication can be achieved while the departmental authentication mode and the user authentication mode are associated with each other. The above-described processing will be described in detail below with reference to FIGS. 19A and 19B and so on.

FIG. 12 illustrates an example of attribute information 1900 of a print job that has been input from the information processing apparatus 101 or the reading device 308 of the image forming apparatus 102. The attribute information 1900 of the print job is generated by the printer driver 401 of the information processing apparatus 101 or based on an input via the input device 305 of the image forming apparatus 102. The generated attribute information 1900 of the print job is stored in the reservation printing area 601 and the other area 605 of the auxiliary storage device 303 of the image forming apparatus 102.

The attribute information 1900 of the print job includes a job name 1901 of an input print job, department identification information 1902 of a department to which a user who has input the print job belongs, and a job owner name (user name) 1903 of the job owner (user) who has input the print job. Further, the attribute information 1900 includes a date 1904 indicating a date on which the print job was input, print settings 1905 such as one-sided/two-sided and color mode, a PC name 1906 of a PC from which the print job was input, a page count 1907, an application ID 1908, and an input source Internet protocol (IP) address 1909.

Hereinafter, the present exemplary embodiment will be described using more specific examples.

FIG. 13 illustrates an example of an initial screen of an authentication screen displayed on the display device 304 of the image forming apparatus 102. The control unit 502 reads the user identification information from the user identification information storage table 1000 stored in the user identification information storage area 603, and displays the read user identification information in the form of an icon or button on an authentication screen 1100. In the following description, it is assumed that an icon is displayed on an authentication screen. Upon receiving a press on the icon, the authentication reception unit 506 performs simple authentication processing. If the user identification information has not yet been registered in the user identification information storage table 1000, the control unit 502 does not display an icon corresponding to user identification information on the authentication screen 1100, as illustrated in FIG. 13.

In a case where the icon displayed by the control unit 502 is displayed on each of a plurality of pages on the authentication screen 1100, the user can change the page on the authentication screen 1100 by pressing a button 1102. Moreover, when the user presses a button 1103, the authentication processing is switched from the simple authentication to the keyboard authentication.

Figure 14A:
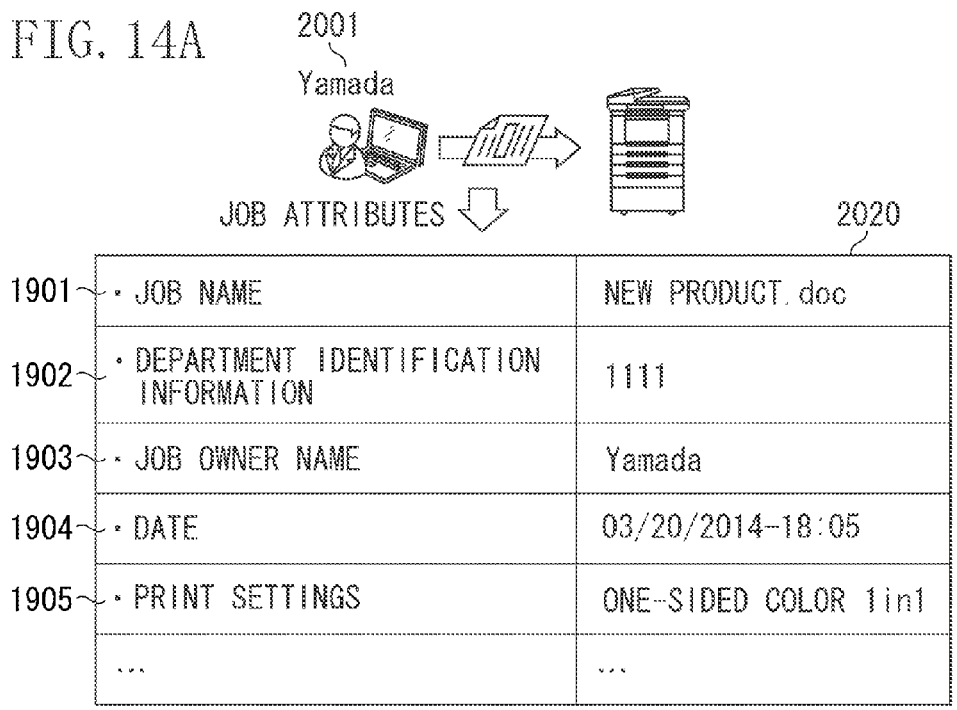
FIGS. 14A and 14B each illustrate an example of inputting a print job.
Figure 14B:
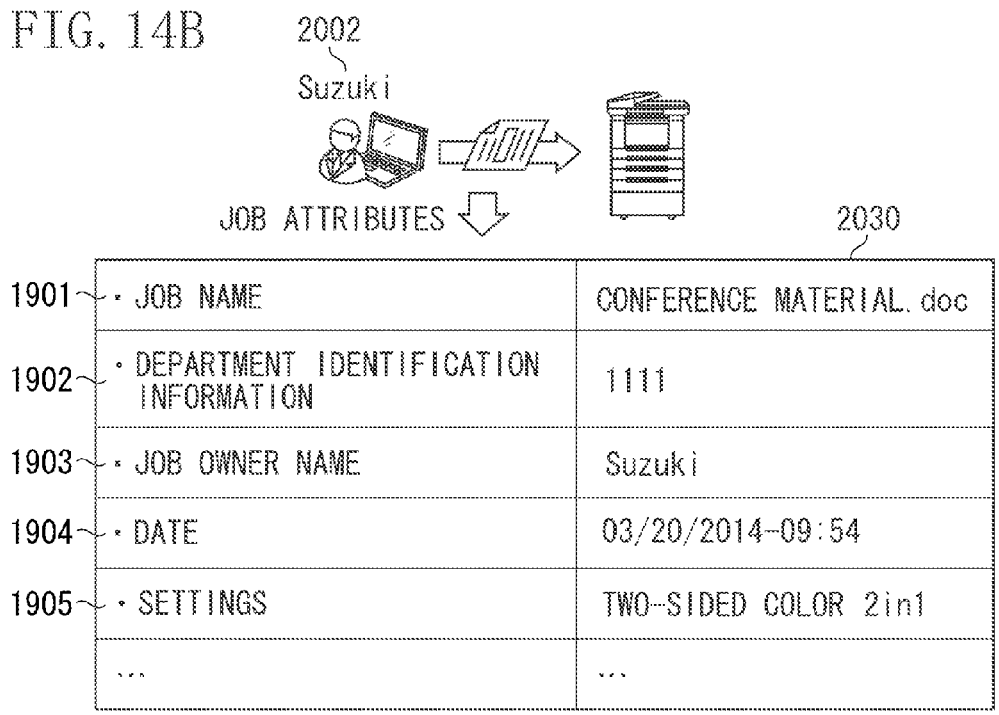

FIGS. 14A and 14B each illustrate an example of inputting a print job. In FIG. 14A, a user "Yamada" 2001 inputs a print job from the information processing apparatus 101 to the image forming apparatus 102. In FIG. 14B, a user "Suzuki" 2002 inputs a print job from the information processing apparatus 101 to the image forming apparatus 102. A table 2020 illustrated in FIG. 14A and a table 2030 illustrated in FIG. 14B indicate details of the attribute information 1900 of the print jobs input by the user "Yamada" 2001 and the user "Suzuki" 2002, respectively. For example, a value of the department identification information 1902 in each of the tables 2020 and 2030 is "1111", whereas values of the job owner names 1903 in the tables 2020 and 2030 are "Yamada" and "Suzuki", respectively.

Subsequently, the user setting determination unit 503 of the image forming apparatus 102 refers to setting information about the forcible reservation mode and the departmental authentication mode, and notifies the control unit 502 of the reference result. The print job storage unit 501 stores the input print job in the reservation printing area 601 according to an instruction from the control unit 502. Further, as described above in FIG. 7, the user identification information storage unit 504 registers "Yamada" and "Suzuki", which are the values of the job owner name 1903, and "1111", which is the value of the department identification information 1902, in the user identification information storage table 1000. Furthermore, as described in FIG. 8, the department identification information storage unit 505 registers "1111", which is the value of the department identification information 1902, in the department identification information storage table 900.

Figure 15:
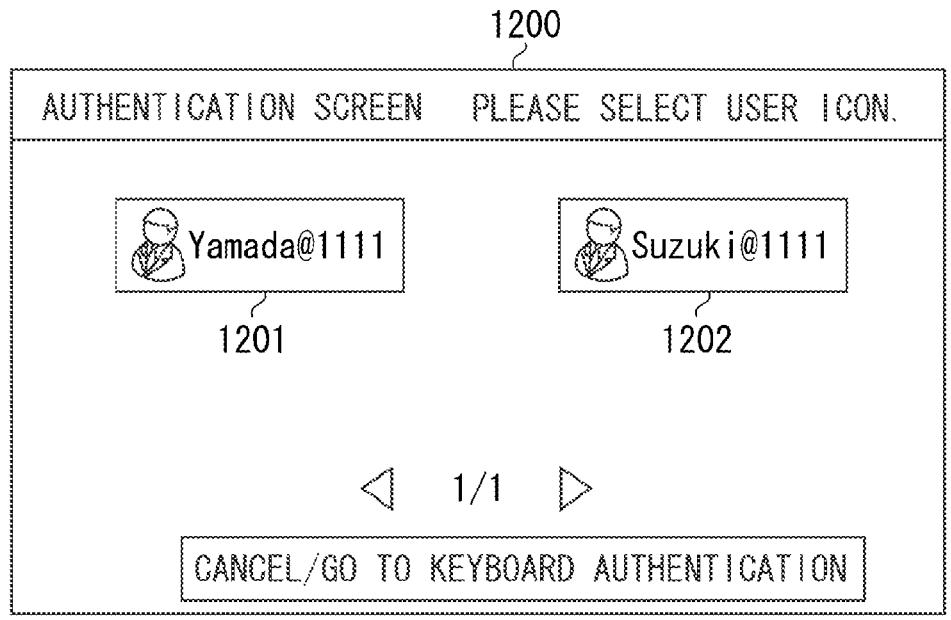
FIG. 15 illustrates another example of an authentication screen.

Subsequently, the control unit 502 reads, from the user identification information storage table 1000 illustrated in FIG. 7, the user name 1001 and the department identification information 1003, and the user name 1002 and the department identification information 1004. The control unit 502 then generates an icon (user icon) 1201 corresponding to user identification information in which the read user name 1001 and the read department identification information 1003 are associated with each other, and an icon (user icon) 1202 corresponding to user identification information in which the read user name 1002 and the read department identification information 1004 are associated with each other, and then displays the generated icons 1201 and 1202 on an authentication screen 1200, as illustrated in FIG. 15.

It is desirable that the icons to be displayed on the authentication screen 1200 should be in the style that allows a user to recognize the icon related to the user at a glance among the icons. Accordingly, the icons 1201 and 1202 displayed on the authentication screen 1200 illustrated in FIG. 15 may be in a style such as icons 2110, 2120, and 2130 illustrated in FIG. 16. The icons 1201 and 1202 displayed on the authentication screen 1200 are an example of an operation object for receiving an operation request for executing a print job.

When the user "Yamada" 2001 selects the icon 1201 related to him (her) on the authentication screen 1200, the authentication reception unit 506 receives a login processing request from the user "Yamada" 2001 and performs login authentication (simple authentication). At this time, the authentication reception unit 506 collates the user identification information corresponding to the icon 1201 with the user identification information in the user identification information storage table 1000. If the two pieces of the user identification information match, the authentication reception unit 506 authenticates the user for login. Such collation is performed in order to prevent the user from being authenticated for login if the user identification information in the user identification information storage table 1000 is changed or deleted by, for example, an administrator during the period between the input of the print job and the press on the icon 1201 and the two pieces of the user identification information do not match as a result of the collation.

Figure 17A:
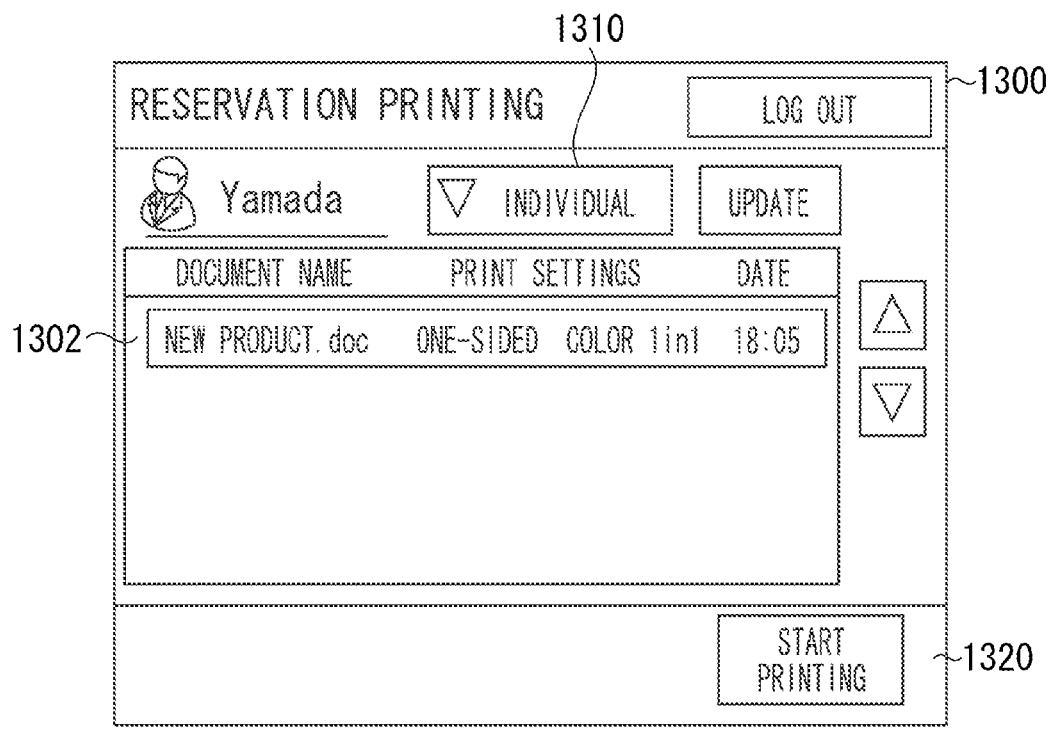
FIGS. 17A and 17B each illustrate an example of an individual user job list screen.

After the login authentication, the control unit 502 displays an individual user job list screen 1300 as illustrated in FIG. 17A. With the individual user job list screen 1300, the user "Yamada" 2001 can check a print job 1302 that has been input by him (her), and press a print button 1320 to print the print job 1302. Similarly, when the user "Suzuki" 2002 selects the icon 1202 related to him (her) on the authentication screen 1200 illustrated in FIG. 15, the authentication reception unit 506 receives a login processing request from the user "Suzuki" 2002 and performs login authentication (simple authentication). At this time, the authentication reception unit 506 collates the user identification information corresponding to the icon 1202 with the user identification information in the user identification information storage table 1000. If the two pieces of the user identification information match, the authentication reception unit 506 authenticate the user for login.

Figure 17B:
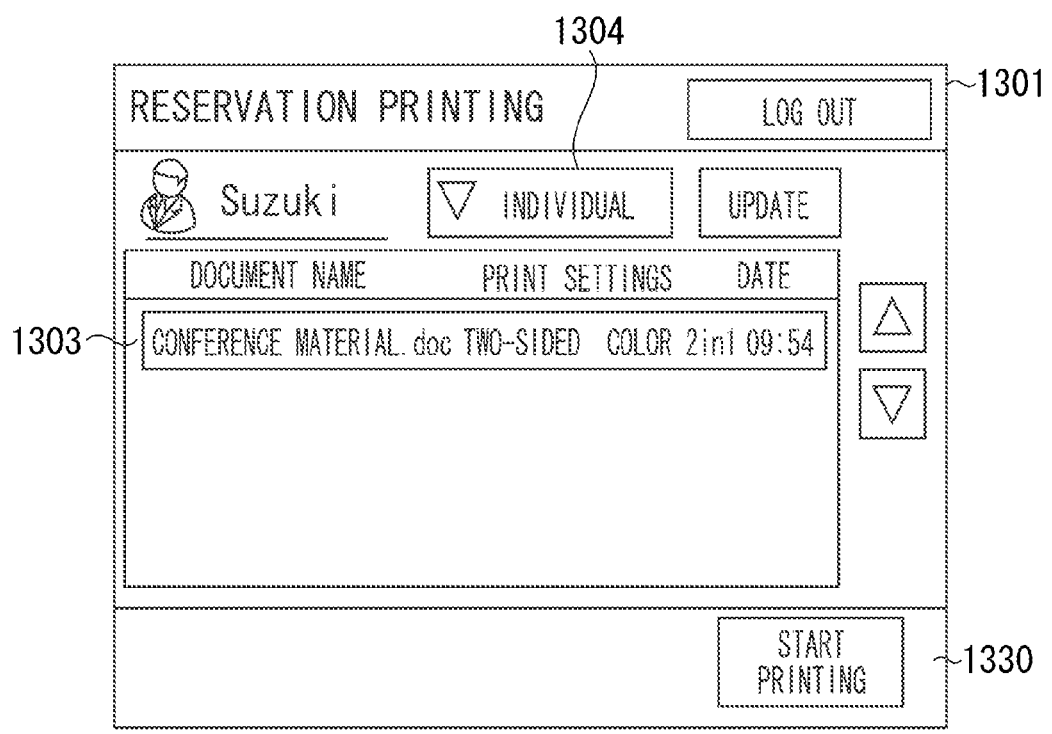

After the login authentication, the control unit 502 displays an individual user job list screen 1301 as illustrated in FIG. 17B. With the individual user job list screen 1301, the user "Suzuki" 2002 can check a print job 1303 that has been input by him (her) or press a print button 1330 to print the print job 1303.

Figure 18:
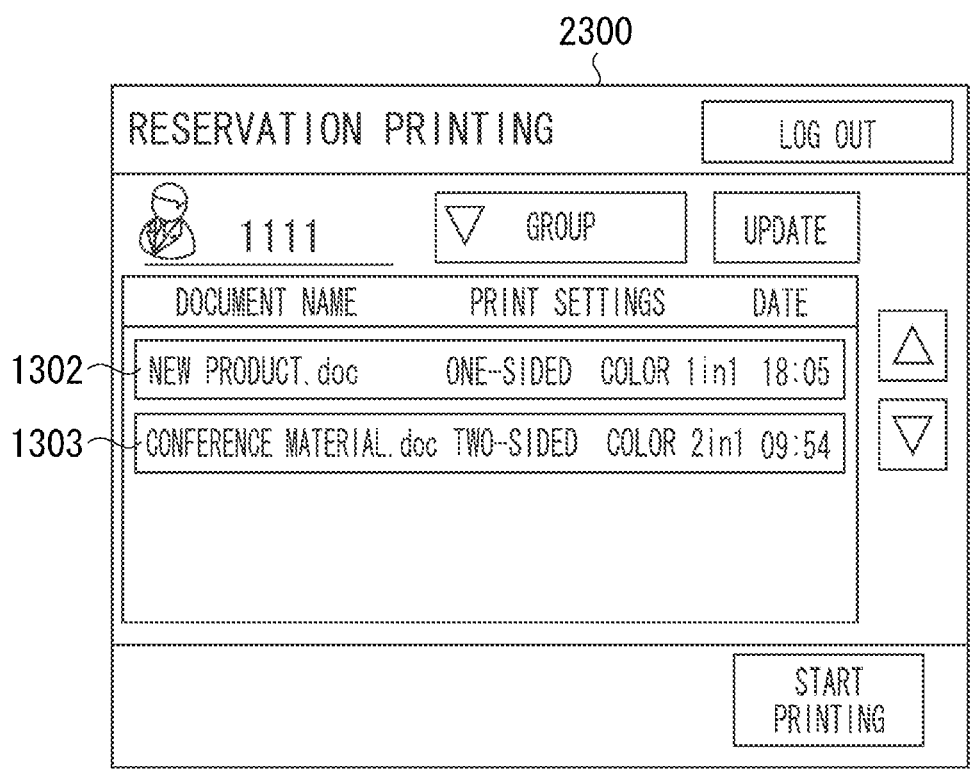
FIG. 18 illustrates an example of a group job list screen.

Further, it is assumed here that the user "Yamada" 2001 presses a button 1310 illustrated in FIG. 17A. The button 1310 is used to switch between an individual user job list and a group job list. In this case, as illustrated in FIG. 18, the control unit 502 displays a group job list screen 2300 including the print job 1302 and also the print job 1303 that is input by another user and has attribute information including the department identification information 1003 associated with the user name 1001 of the user "Yamada" 2001. That is, the control unit 502 can display the group job list screen 2300 including not only the print job 1302 input by the user "Yamada" 2001, but also the print job 1303 input by the other user "Suzuki" 2002 who belongs to the same department as the user "Yamada" 2001. Accordingly, the user "Yamada" 2001 can check a list of print jobs which have been input by the users in the department to which the user "Yamada" 2001 belongs, and perform printing. Each of the individual user job list screen 1300 and the group job list screen 2300 described above is an example of a print job list screen.

Similarly, when the user "Suzuki" 2002 presses a button 1304 illustrated in FIG. 17B, the control unit 502 displays the group job list screen 2300 including the print job 1303 and also the print job 1302 that is input by the other user "Yamada" 2001 and has attribute information including the department identification information 1004 associated with the user name 1002 of the user "Suzuki" 2002.

Figure 19A:
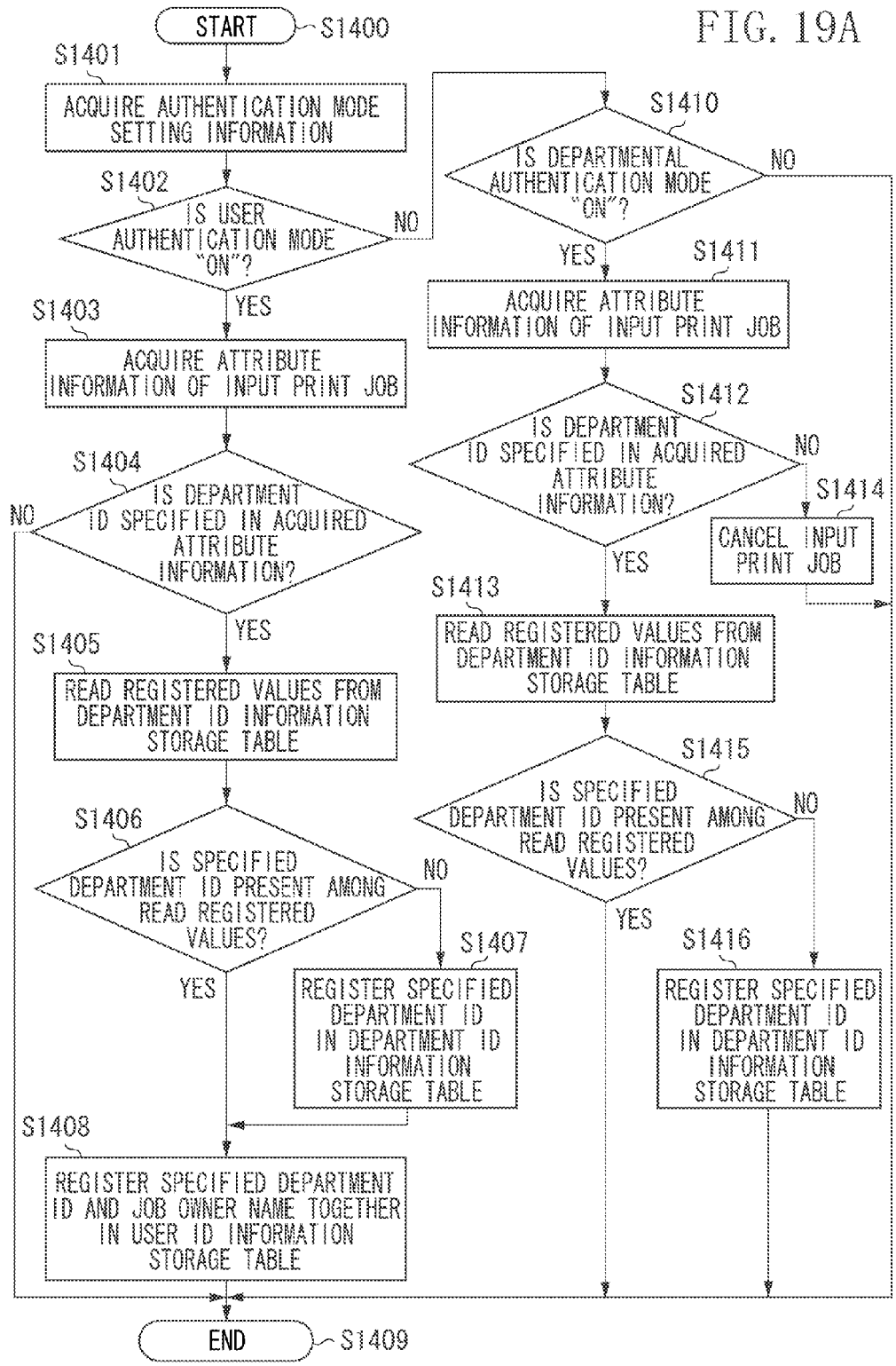
FIGS. 19A and 19B are flowcharts each illustrating an example of processing performed by the image forming apparatus.
Figure 19B:
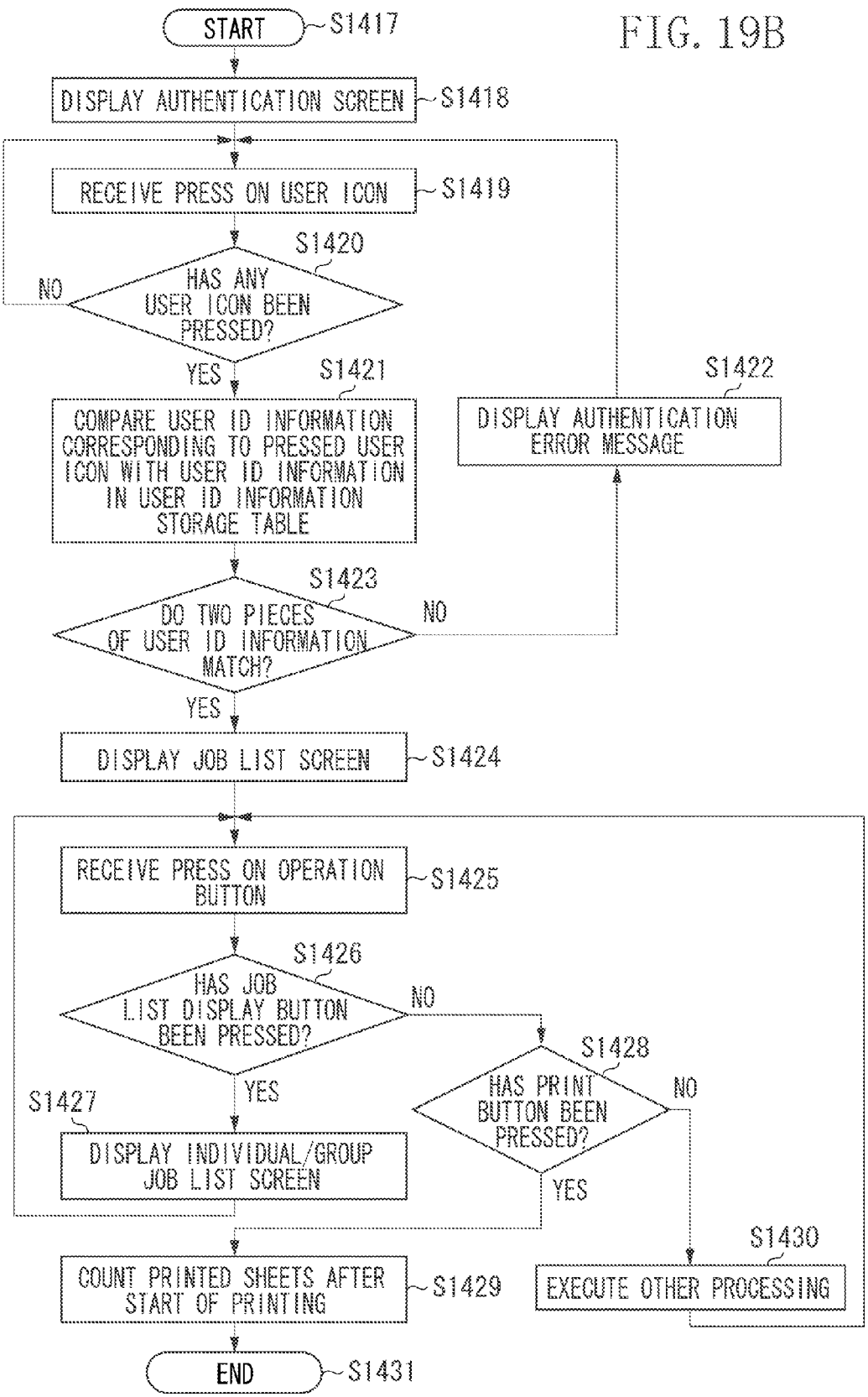

FIGS. 19A and 19B are flowcharts each illustrating an example of processing performed by the image forming apparatus 102 in the reservation printing system according to the present exemplary embodiment. As described above, the CPU 301 of the image forming apparatus 102 reads a program from the auxiliary storage device 303 and executes the program to implement the processing illustrated in FIGS. 19A and 19B. In this processing, the operation mode of the image forming apparatus 102 is a forcible reservation mode. FIG. 19A illustrates processing for receiving a job that is input from the information processing apparatus 101.

In step S1401, the user setting determination unit 503 acquires setting information about the departmental authentication mode and setting information about the user authentication mode from the auxiliary storage device 303. It is assumed that the setting information set on the setting screen 800 illustrated in FIG. 10 and the setting information on the setting screen 1800 illustrated in FIG. 11 are stored in the auxiliary storage device 303 of the image forming apparatus 102.

In step S1402, the user setting determination unit 503 determines whether the setting value of the user authentication mode is ON. That is, the user setting determination unit 503 determines whether the user authentication mode is enabled. If the user setting determination unit 503 determines that the user authentication mode is ON (YES in step S1402), the processing proceeds to step S1403. If the user setting determination unit 503 determines that the user authentication mode is OFF (NO in step S1402), the processing proceeds to step S1410.

In step S1403, the control unit 502 acquires the attribute information 1900 of an input print job that has been stored in the reservation printing area 601.

In step S1404, the control unit 502 determines whether the department identification information 1902 is included in the attribute information 1900 acquired in step S1403. If the control unit 502 determines that the department identification information 1902 is included in the acquired attribute information 1900 (YES in step S1404), the processing proceeds to step S1405. If the control unit 502 determines that the department identification information 1902 is not included in the acquired attribute information 1900 (NO in step S1404), the processing proceeds to step S1409.

In step S1405, the control unit 502 reads registered values from the department identification information storage table 900 stored in the department identification information storage area 604.

In step S1406, the control unit 502 determines whether the department identification information 1902 identified in step S1404 is included in the registered values read in step S1405. If the control unit 502 determines that the department identification information 1902 is included in the registered values (YES in step S1406), the processing proceeds to step S1408. If the control unit 502 determines that the department identification information 1902 is not included in the registered values (NO in step S1406), the processing proceeds to step S1407.

In step S1407, the department identification information storage unit 505 registers the department identification information 1902 in the department identification information storage table 900 of the department identification information storage area 604.

In step S1408, the user identification information storage unit 504 registers the department identification information 1902 and the job owner name 1903 included in the attribute information 1900 of the print job, in the user identification information storage table 1000 of the user identification information storage area 603. That is, the user identification information storage unit 504 registers user identification information in which the department identification information 1902 and the job owner name 1903 are associated with each other.

In step S1410, the user setting determination unit 503 determines whether the setting value of the departmental authentication mode is ON. That is, the user setting determination unit 503 determines whether the departmental authentication mode is enabled when the user authentication mode is disabled. If the user setting determination unit 503 determines that the setting value of the departmental authentication mode is ON and the setting value of the user authentication mode is OFF (YES in step S1410), the processing proceeds to step S1411. If not (NO in step S1410), the processing proceeds to step S1409.

Processing in steps S1411, S1413, S1415, and S1416 is similar to that in steps S1403, S1405, S1406, and S1407, respectively.

In step S1412, the control unit 502 determines whether the department identification information 1902 is included in the attribute information 1900 acquired in step S1411. If the control unit 502 determines that the department identification information 1902 is included in the acquired attribute information 1900 (YES in step S1412), the processing proceeds to step S1413. If the control unit 502 determines that the department identification information 1902 is not included in the acquired attribute information 1900 (NO in step S1412), the processing proceeds to step S1414.

In step S1414, the control unit 502 cancels the input print job.

FIG. 19B illustrates processing from login using an authentication screen 2400 (see FIG. 20) to printing.

Figure 20:
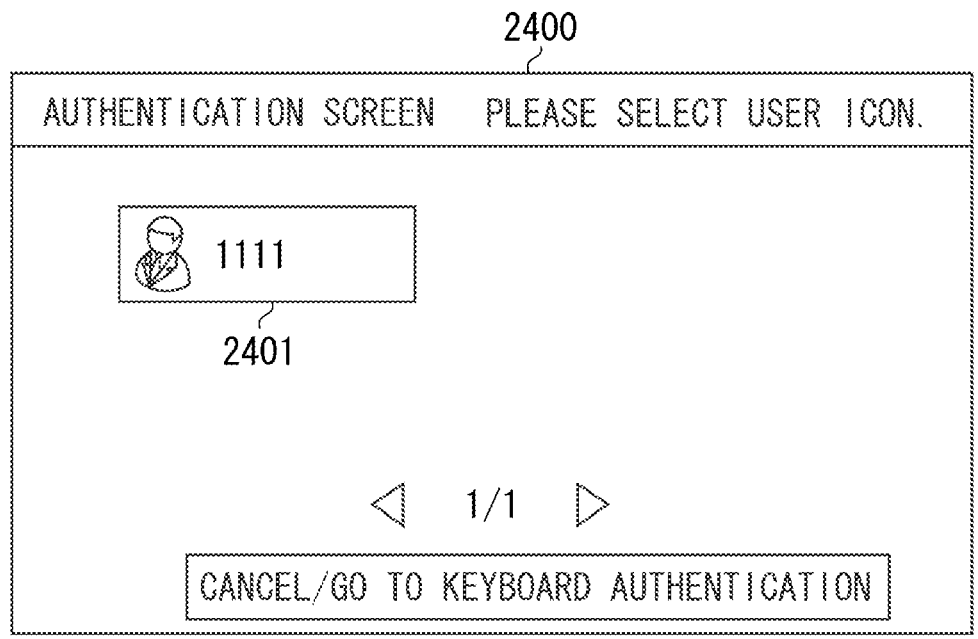
FIG. 20 illustrates yet another example of an authentication screen.

In step S1418, the control unit 502 displays the authentication screen 2400 illustrated in FIG. 20 or the authentication screen 1200 illustrated in FIG. 15. As illustrated in FIG. 20, a display value of an icon 2401 displayed on the authentication screen 2400 is the value of the department identification information 1902. That is, the control unit 502 generates the icon 2401 from the department identification information 1902 registered in step S1416, and displays the generated icon 2401 on the authentication screen 2400. When the user presses the icon 2401 and is authenticated for login, the control unit 502 displays the group job list screen 2300 illustrated in FIG. 18. In the case of FIG. 15, the control unit 502 generates the icon 1201 from the user identification information registered in step S1408, and displays the generated icon 1201 on the authentication screen 1200.

In step S1419, the authentication reception unit 506 receives a press on the icons 1201, 1202, 2401, or an icon 2501 (see FIG. 21) via the authentication screens 1200, 2400, or an authentication screen 2500 (see FIG. 21) displayed on the display device 304.

In step S1420, the authentication reception unit 506 determines whether any one of the icons has been pressed. If the authentication reception unit 506 determines that any one of the icons has been pressed (YES in step S1420), the processing proceeds to step S1421. If the authentication reception unit 506 determines that any one of the icons has not been pressed (NO in step S1420), the processing returns to step S1419.

In step S1421, the authentication reception unit 506 compares the user identification information corresponding to the icon determined to have been pressed in step S1420 with the user identification information in the user identification information storage table 1000. This process is performed in order to prevent the user from being authenticated for login if the user identification information in the user identification information storage table 1000 is changed or deleted by, for example, an administrator during the period between the input of the print job and the press on the icon and a result of the comparison shows that the two pieces of the user identification information do not match. If the icon 2401 is determined to have been pressed in step S1420, then in step S1421, the authentication reception unit 506 compares the department identification information corresponding to the icon 2401 with the department identification information in the department identification information storage table 900.

In step S1423, if the authentication reception unit 506 determines that the two pieces of the user identification information match as a result of the comparison performed in S1421 (YES in step S1423), the processing proceeds to step S1424. If the authentication reception unit 506 determines that the two pieces of the user identification information do not match (NO in step S1423), the processing proceeds to step S1422.

In step S1422, the control unit 502 displays a warning message indicating that an authentication error has occurred.

In step S1424, the control unit 502 displays the individual user job list screen 1300 illustrated in FIG. 17A or the group job list screen 2300 illustrated in FIG. 18 (performs display control processing), depending on the icon pressed in step S1419. Since a relationship between the pressed icon and each job list screen has been described above, the description thereof is omitted here.

Moreover, it is assumed here that the user has instructed the image forming apparatus 102 to execute a print job via the individual user job list screen 1300 or the group job list screen 2300 displayed in step S1424, and then the image forming apparatus 102 has performed printing. In such a case, in step S1429, the control unit 502 stores and manages the page count 1907 included in the attribute information 1900 of the executed print job, in the other area 605 of the auxiliary storage device 303. At this time, the control unit 502 can count and manage the number of printed sheets based on the page count 1907 on an individual user basis or a department-by-department basis (belonging-basis). That is, even when the departmental authentication mode and the user authentication mode are both enabled, the control unit 502 can manage a processing result of the executed print job on an individual user basis or a department-by-department basis. This enhances the convenience of the administrator and the user of the image forming apparatus 102.

Moreover, in step S1425, the control unit 502 receives a press on the button 1310 or 1304 via the individual user job list screens 1300 or 1301 displayed on the display device 304.

In step S1426, the control unit 502 determines whether the button 1310 or 1304 has been pressed based on a result of the processing in step S1425. If the control unit 502 determines that the button 1310 or 1304 has been pressed (YES in step S1426), the processing proceeds to step S1427. On the other hand, if the control unit 502 determines that the button 1310 or 1304 has not been pressed (NO in step S1426), the processing proceeds to step S1428.

In step S1427, the control unit 502 determines which button (individual user button or group button) has been pressed in step S1426. If the control unit 502 determines that the group button has been pressed, the control unit 502 displays the group job list screen 2300. If the control unit 502 determines that the individual user button has been pressed, the control unit 502 displays the individual user job list screen 1300 or 1301. In the present exemplary embodiment, the buttons 1310 and 1304 are used to switch between the individual user job list screen and the group job list screen.

In step S1428, the control unit 502 determines whether the print button 1320 or 1330 has been pressed in addition to the button 1310 or 1304 (individual user/group button). If the control unit 502 determines that the print button 1320 or 1330 has been pressed (YES in step S1428), the processing proceeds to step S1429. If the control unit 502 determines that the print button 1320 or 1330 has not been pressed (NO in step S1428), the processing proceeds to step S1430. In step S1430, the control unit 502 executes processing such as job deletion processing, other than the processing for printing and the processing for displaying a job list described in the present exemplary embodiment.

According to the present exemplary embodiment, the user can eliminate the cumbersome task of registering department identification information (e.g., department ID) and then associating the registered department identification information with user name information (or user ID that identifies a user) in advance. More specifically, user name information and department identification information are automatically registered in association with each other only by a user inputting a print job to the image forming apparatus 102. This allows the user to readily log in to the image forming apparatus 102 via an authentication screen with simple authentication. That is, according to the present exemplary embodiment, a user authentication mode and a departmental authentication mode can be readily associated with each other in execution of a print job.

In a second exemplary embodiment, setting items that can be set on the setting screen for the departmental authentication mode differ from those of the first exemplary embodiment.

Figure 22:
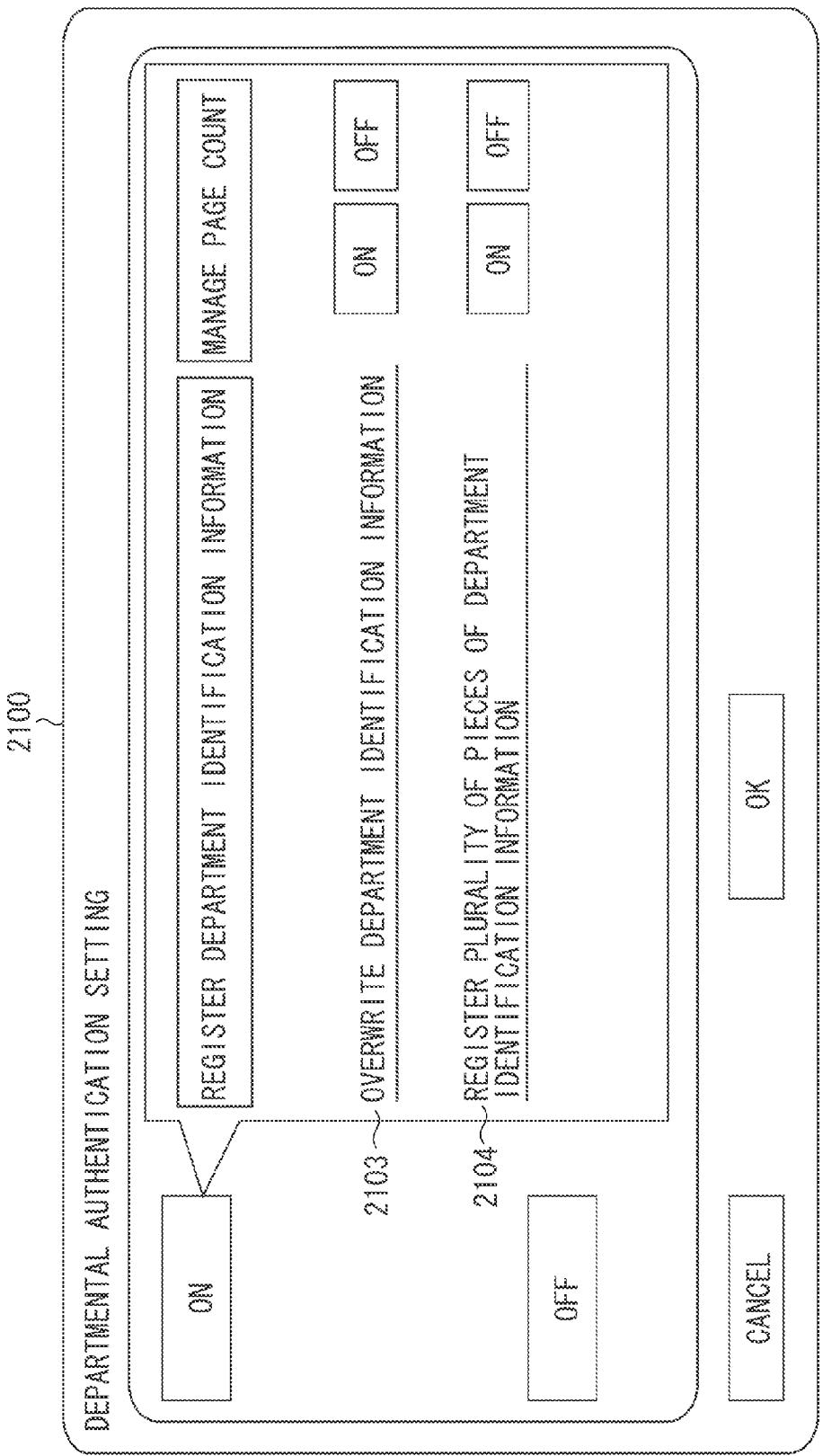
FIG. 22 illustrates another example of a screen for setting a departmental authentication mode.

FIG. 22 illustrates an example of a setting screen 2100 for the departmental authentication mode of the image forming apparatus 102 according to the present exemplary embodiment. The setting screen 2100 includes a setting item 2103 "overwrite department identification information" and a setting item 2104 "register plurality of pieces of department identification information", in addition to the setting items on the setting screen 800 described above with reference to FIG. 10. By pressing an ON/OFF button for each of the setting items 2103 and 2104, the user can switch between enabled and disabled.

If the setting of the setting item 2103 "overwrite department identification information" is enabled, the user identification information storage unit 504 continuously overwrites the department identification information registered in a user identification information storage table with a new value.

Figures 23A, 23B:
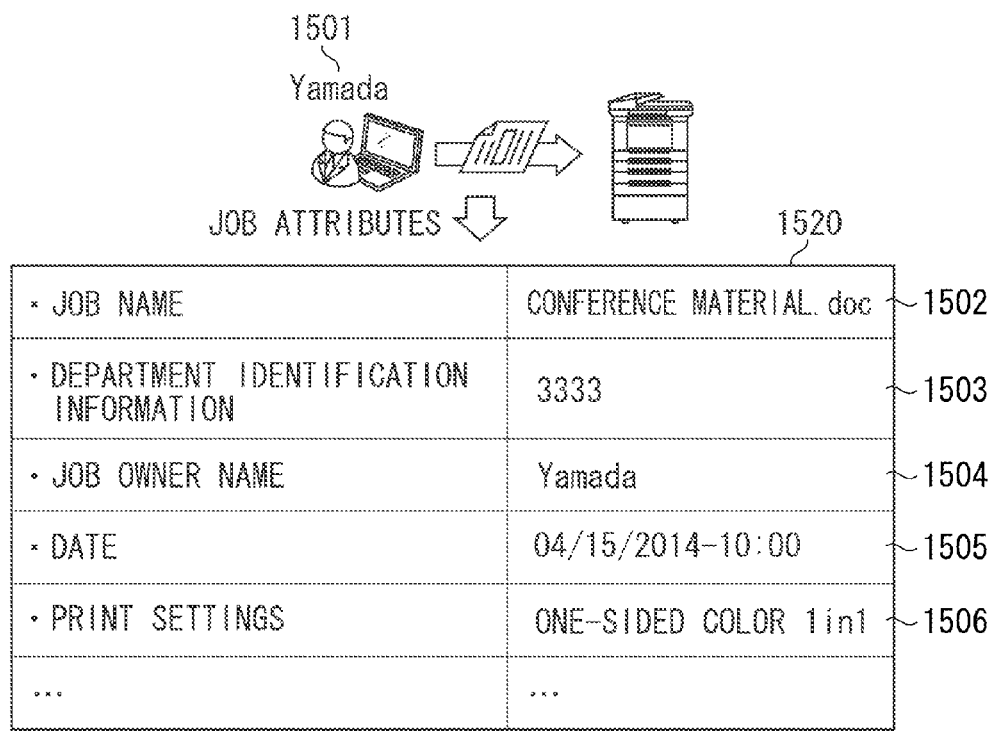
FIGS. 23A, 23B, 23C, and 23D illustrates an example of an overview of processing according to a second exemplary embodiment.
Figures 23C, 23D:
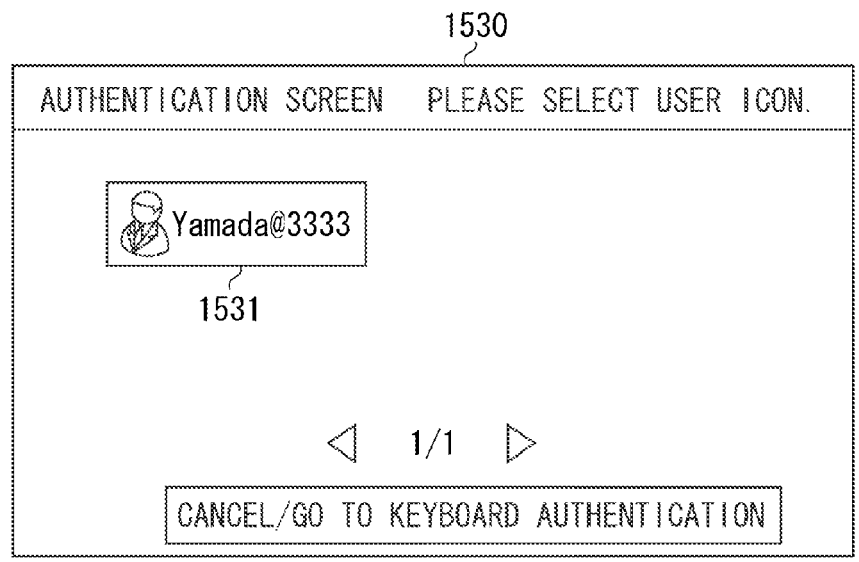

For example, as illustrated in FIG. 23A, a user "Yamada" 1501 inputs a print job with attribute information 1520 including department identification information 1503 having a value of "3333" from the information processing apparatus 101. In this case, the department identification information storage unit 505 newly registers the value "3333" in a department identification information storage table 1510 as illustrated in FIG. 23B. Moreover, as illustrated in FIG. 23C, the user identification information storage unit 504 updates the department identification information in a user identification information storage table 1520 by overwriting it with the new value "3333". That is, if a print job with attribute information that includes the same user name as that of the registered user identification information and also includes department identification information different from that of the registered user identification information is input to the image forming apparatus 102, the user identification information storage unit 504 updates the department identification information by overwriting it with a new value. In the user identification information storage table 1520, a password and a role are registered. The password and the role are pieces of information that can be registered afterward by a user or an administrator. Although such information may be used in authentication processing, the detailed description thereof is omitted here.

Moreover, as illustrated in FIG. 23D, the control unit 502 generates an icon 1531 corresponding to the user identification information registered in the updated user identification information storage table 1520, and displays the generated icon 1531 on an authentication screen 1530. That is, the control unit 502 updates the icon that has been already generated with the icon 1531 that has been newly generated according to the updated user identification information. Since the generation of icons based on the user identification information has been described above, the description thereof is omitted here. Thus, even if the user specifies wrong department identification information when inputting a print job, the user can correct the department identification information registered in the user identification information storage table by specifying correct department identification information and inputting the print job again.

Figures 24A, 24B:
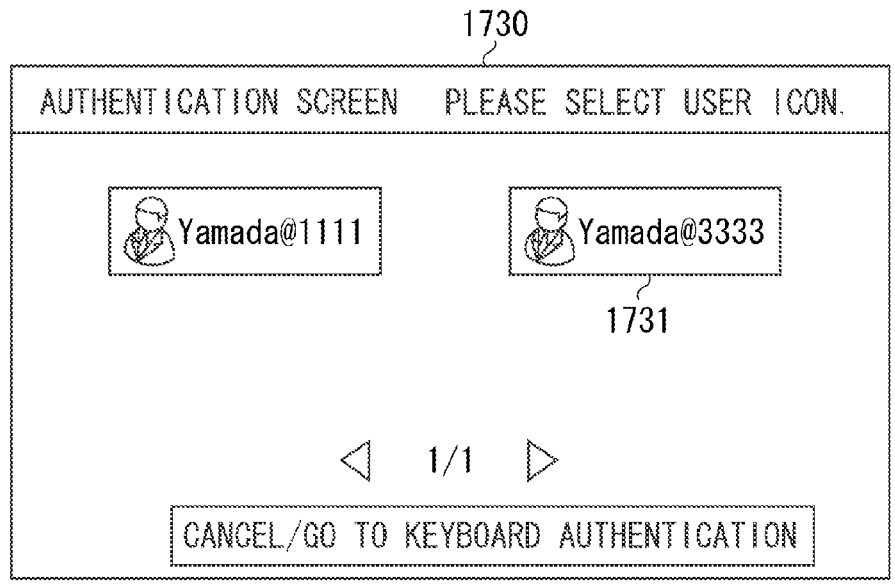
FIGS. 24A and 24B illustrate another example of an overview of processing according to the second exemplary embodiment.

Moreover, it is assumed here that when the setting item 2104 "register plurality of pieces of department identification information" illustrated in FIG. 22 is set to be enabled, a print job including department identification information 1503 with the value "3333" as illustrated in FIG. 23A is input to the image forming apparatus 102. In this case, as illustrated in FIG. 24A, the user identification information storage unit 504 newly registers user identification information including department identification information 1503 with the value "3333" in a user identification information storage table 1700. Then, the control unit 502 generates an icon 1731 corresponding to the user identification information that includes the department identification information 1503 with the value "3333" and is newly registered in the user identification information storage table 1700, and displays the generated icon 1731 on an authentication screen 1730, as illustrated in FIG. 24B. As a result, even if a single user belongs to a plurality of departments, simple authentication can be performed on the authentication screen.

According to the present exemplary embodiments, even if a user belongs to a plurality of departments, department identification information can be flexibly managed by automatically overwriting it with new one or registering a plurality of pieces of department identification information according to the setting of a departmental authentication mode. Hence, user-friendliness can be enhanced.

As described above, each of the exemplary embodiments can provide a technique capable of readily associating an authentication mode for authenticating a user according to where the user belongs with an authentication mode for authenticating an individual user.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2014-139838, filed Jul. 7, 2014 and Japanese Patent Application No. 2015-023356, filed Feb. 9, 2015, which are hereby incorporated by reference herein in their entirety.

What is claimed is:

1. An image forming apparatus to be used in an image forming system that includes a storing unit configured to store user information and group information, the image forming apparatus comprising:
   a controlling unit that performs control based on a program and includes at least one memory that stores the program and at least one processor that executes the program,
   wherein the controlling unit is configured to perform the following processing:
      processing of acquiring print data that includes user information and group information that is not associated with the user information in the storing unit; and processing of causing the storing unit to store said non-associated group information in such a way as to associate, with the user information, said non-associated group information.

2. The image forming apparatus according to claim 1, wherein the controlling unit associates the user information and the group information with each other to register the associated information as the user identification information.

3. The image forming apparatus according to claim 1, further comprising a management unit configured to manage a count of a processing result of the executed print data on an individual basis or on a group basis.

4. The image forming apparatus according to claim 1, further comprising a storage unit configured to store and reserve in a storage device a print data that has been input from an information processing apparatus with which the image forming apparatus is capable of communicating via a network.

5. The image forming apparatus according to claim 1, further comprising:
a displaying unit configured to display information,
wherein the displaying unit is capable of displaying a list of print data associated with the group information.

6. The image forming apparatus according to claim 5, further comprising:
an image forming unit configured to form an image on the basis of the print data,
wherein the controlling unit causes the image forming unit to form the image in accordance with a print instruction using the list.

7. The image forming apparatus according to claim 1, wherein the user information is first user information,
wherein said non-associated group information is particular group information,
wherein the displaying unit is capable of selectively displaying a plurality of lists including a first list, a second list, and a third list, and
wherein the controlling unit performs the following processing:
processing of acquiring first print data that includes the first user information and the particular group information;
processing of acquiring second print data that includes the second user information and the particular group information;
processing of causing information about the first print data to be displayed on the first list in a state in which both the first print data and the second print data have been acquired;
processing of causing information about the second print data to be displayed on the second list in a state in which both the first print data and the second print data have been acquired; and
processing of causing information about the first print data and the second print data to be displayed on the third list in a state in which both the first print data and the second print data have been acquired.

8. The image forming apparatus according to claim 7, further comprising:
a receiving unit configured to receive an instruction from a user; and
an authentication unit configured to authenticate the user, wherein
the controlling unit causes the displaying unit to display the first list in accordance with a first instruction by the user authenticated as the first user,
the controlling unit causes the displaying unit to display the third list in accordance with a second instruction by the user authenticated as the first user,
the controlling unit causes the displaying unit to display the second list in accordance with the first instruction by the user authenticated as the second user, and
the controlling unit causes the displaying unit to display the third list in accordance with the second instruction by the user authenticated as the second user.

9. The image forming apparatus according to claim 7,
wherein the displaying unit is capable of displaying a first screen that has a plurality of objects including a first object and a second object that are selectable,
wherein a screen displaying the first list is a second screen, a third object being thereon,
wherein a screen displaying the second list is a third screen,
wherein a screen displaying the third list is a fourth screen, and
wherein the controlling unit
causes the displaying unit to display the second screen when the first object is selected,
causes the displaying unit to display the third screen when the second object is selected, and
causes the displaying unit to display the fourth screen when the third object is selected.

10. A method for controlling an image forming apparatus to be used in an image forming system for executing a print data, the image forming system comprising a storing unit configured to store user information and group information, the method comprising:
processing of acquiring print data that includes user information and group information that is not associated with the user information in the storing unit; and
processing of causing the storing unit to store said non-associated group information in such a way as to associate, with the user information, said non-associated group information.

11. A non-transitory computer-readable storage medium storing a program for causing a computer to execute a method for controlling an image forming apparatus to be used in an image forming system for executing a print data, the image forming system comprising a storing unit configured to store user information and group information, the method comprising:
processing of acquiring print data that includes user information and group information that is not associated with the user information in the storing unit; and
processing of causing the storing unit to store said non-associated group information in such a way as to associate, with the user information, said non-associated group information.

12. An image forming apparatus, capable of communicating with an external device, that uses a storing unit configured to store registration information, the image forming apparatus comprising:
a controller, having a processor which executes instructions stored in a memory or having circuitry, being configured to:
acquire, form the external device, print data to which specific user information and specific group information have been attached, the specific user information having been registered as the registration information without an association with the specific group information; and associate the specific group information with the specific user information as the registration information in accordance with the acquiring of print data.

13. A method for controlling an image forming apparatus, capable of communicating with an external device, that uses a storing unit configured to store registration information, the method comprising:

acquiring, form the external device, print data to which specific user information and specific group information have been attached, the specific user information having been registered as the registration information without an association with the specific group information; and associating the specific group information with the specific user information as the registration information in accordance with the acquiring of print data.

14. A non-transitory computer-readable storage medium storing a program for causing a computer to execute a method for controlling an image forming apparatus, capable of communicating with an external device, that uses a storing unit configured to store registration information, the method comprising:

acquiring, form the external device, print data to which specific user information and specific group information have been attached, the specific user information having been registered as the registration information without an association with the specific group information; and associating the specific group information with the specific user information as the registration information in accordance with the acquiring.

15. An image forming apparatus, capable of communicating with an external device, that uses a storing unit configured to store registration information, the image forming apparatus comprising:

a controller, having a processor which executes instructions stored in a memory or having circuitry, being configured to:

acquire, form the external device, print data to which specific group information has been attached, the specific group information having been unregistered as the registration information; and register the specific group information as the registration information in accordance with the acquiring of print data.

16. A method for controlling an image forming apparatus, capable of communicating with an external device, that uses a storing unit configured to store registration information, the method comprising:

acquiring, form the external device, print data to which specific group information has been attached, the specific group information having been unregistered as the registration information; and registering the specific group information as the registration information in accordance with the acquiring.

17. A non-transitory computer-readable storage medium storing a program for causing a computer to execute a method for controlling an image forming apparatus, capable of communicating with an external device, that uses a storing unit configured to store registration information, the method comprising:

acquiring, form the external device, print data to which specific group information has been attached, the specific group information having been unregistered as the registration information; and registering the specific group information as the registration information in accordance with the acquiring.

* * * * *